(12) United States Patent
Krishnamoorthy et al.

(10) Patent No.: US 8,701,127 B2
(45) Date of Patent: Apr. 15, 2014

(54) WEB SERVICES ACCESS TO CONTENT ITEMS STORED BY COLLABORATION SYSTEMS

(75) Inventors: Arun Krishnamoorthy, Sammamish, WA (US); Siddharth Rajendra Shah, Bothell, WA (US); Ramanathan Somasundaram, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1094 days.

(21) Appl. No.: 12/688,197

(22) Filed: Jan. 15, 2010

(65) Prior Publication Data

US 2011/0179427 A1 Jul. 21, 2011

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................... 719/328; 707/705

(58) Field of Classification Search
USPC ................................... 707/999.001; 719/328
See application file for complete search history.

(56) References Cited

U.S. PATENT DOCUMENTS

| | | | |
|---|---|---|---|
| 6,631,369 B1 | 10/2003 | Meyerzon | |
| 6,725,214 B2 | 4/2004 | Garcia-Chiesa | |
| 7,188,150 B2 | 3/2007 | Grueneberg | |
| 8,352,427 B2 * | 1/2013 | Mohr et al. | 707/634 |
| 2003/0177124 A1 | 9/2003 | Sauri | |
| 2005/0228693 A1 * | 10/2005 | Webb et al. | 705/2 |
| 2007/0208716 A1 | 9/2007 | Krishnaprasad | |
| 2008/0162498 A1 | 7/2008 | Omoigui | |

OTHER PUBLICATIONS

Birman et al, Building Collaboration Applications that Mix Web Services Hosted Content with P2P Protocols, IEEE, 2009, DOI 10.1109/ICWS.2009.59, pp. 509-518.*
.NET Message Framing Protocol Specification, Microsoft Corporation, Copyright © 2009, 52 pages.
Bradner, S., Key Words for Use in RFCs to Indicate Requirement Levels, Mar. 1997, 3 pages.
Configure Search Server to crawl Lotus Notes (Search Server 2008), Microsoft Corporation, Copyright © 2010, 5 pages.
Configuring the crawler server on Windows to crawl Lotus Domino sources, IBM Corporation, Copyright © 2004, 2 pages.
Fielding et al., Hypertext Transfer Protocol—HTTP/1.1, The Internet Society, Copyright © 1999, 165 pages.
Microsoft Office Server Master Glossary, Microsoft Corporation, Copyright © 2009, 92 pages.
Namespaces in XML 1.0 (Second Edition), WC3®, Copyright © 2006, 10 pages.

(Continued)

*Primary Examiner* — Diem Cao
(74) *Attorney, Agent, or Firm* — Tom Wong; Jim Ross; Micky Minhas

(57) ABSTRACT

A computing system receives a web services request to invoke a method of web Application Programming Interface (API). In response to receiving the web services request, the computing system invokes a method of a language-dependent API of a client component in a collaboration system. The client component communicates with a collaboration server component in the collaboration system using a proprietary communications protocol. The method of the language-dependent API is a method to obtain data from the collaboration server component. After invoking the method, the computing system sends a web services response whose contents depend on the data obtained from the collaboration server component.

20 Claims, 4 Drawing Sheets

(56) References Cited

OTHER PUBLICATIONS

Oracle® Secure Enterprise Search, Administrator's Guide, 10g Release 1 (10.1.8.2), No. E10418-03, Nov. 2008, ORACLE®, Copyright © 2006, 2008, 316 pages.

Rescorla, E., HTTP Over TLS, The Internet Society, Copyright © 2000, 7 pages.

Service Platform Topology Web Service Protocol Specification, Microsoft Corporation, Copyright © 2009, 25 pages.

SharePoint Security Token Service Web Service Protocol Specification, Microsoft Corporation, Copyright © 2009, 21 pages.

Simple Object Access Protocol (SOAP) 1.1, WC3®, Copyright © 2000, 35 pages.

SOAP Version 1.2 Part 1: Messaging Framework, WC3®, Copyright © 2003, 53 pages.

SOAP Version 1.2 Part 2 Adjuncts, WC3®, Copyright © 2003, 25 pages.

Understanding Exchange Search, Microsoft Corporation, Copyright © 2010, 5 pages.

Web Services Description Language (WSDL) 1.1, WC3®, Copyright © 2001, 31 pages.

Windows Protocols Master Glossary, Microsoft Corporation, Copyright © 2009, 121 pages.

Word Binary File Format (.doc) Structure-Specification, Microsoft Corporation, Copyright © 2009, 612 pages.

XML Schema Part 1 Structures, WC3®, Copyright © 2001, 94 pages.

XML Schema Part 2 Datatypes, WC3®, Copyright © 2001, 102 pages.

\* cited by examiner

WEB SERVICES ACCESS TO CONTENT ITEMS STORED BY COLLABORATION SYSTEMS

BACKGROUND

Collaboration systems allow users to collaborate with each other. Such collaboration systems comprise collaboration server components and client components. A collaboration server component of a collaboration system receives and stores content items generated by users. Other users can use the client components of the collaboration system to access content items stored by collaboration server components of the collaboration system. In this way, the users can create and access content items.

Various types of content items can be stored and accessed by collaboration systems. Example types of content items include e-mail messages, calendar appointments, contacts, task list items, instant messenger conversation logs, word processor documents, spreadsheet documents, audio documents, video documents, and other types of content items.

In some collaboration systems, the collaboration server components of the collaboration systems and the client components of the collaboration systems communicate with each other using a proprietary protocol. A proprietary protocol is a communications protocol that is controlled by one or more entities, to the exclusion of others. In other words, a proprietary protocol is not an open protocol. Because the collaboration server components of such a collaboration system and the client components of the collaboration system communicate with each other using a proprietary protocol, other software developers cannot freely develop new client components that communicate with the collaboration server components of the collaboration system. As a result, access to content items stored by such collaboration systems is restricted.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

In one aspect, a method comprises receiving, by a computing system, a web services request to invoke a method of a web Application Programming Interface (API). The method also comprises in response to receiving the web services request, invoking, by the computing system, a method of a language-dependent API of a client component in a collaboration system. The client component communicates with a collaboration server component in the collaboration system using a proprietary communications protocol. The method of the language-dependent API is a method to obtain data from the collaboration server component. In addition, the method comprises after invoking the method of the language-dependent API, sending, by the computing system, a web services response whose contents depend on the data obtained from the collaboration server component.

In another aspect, a method comprises sending, by a component provided by a computing device, a web services request to invoke a method of a web Application Programming Interface (API) that uses a collaboration client component of a collaboration system to obtain data from a collaboration server component in the collaboration system. The collaboration server component and the client component exclusively communicate with each other using a proprietary communications protocol. Furthermore, the method comprises receiving, by the component, a web services response from the web API as a response to the web services request. The web services response contains content based on the data obtained from the collaboration server component.

In yet another aspect, a computing system comprises a processing system. The computing system also comprises a computer-readable data storage system that stores software instructions that, when executed by the processing system, cause the computing system to send an enumerate servers request to a web API that obtains data from collaboration server components in a collaboration system. The enumerate servers request is a web services request to invoke an enumerate servers method of the web API. The collaboration server component in the collaboration system and client components in the collaboration system exclusively communicate with each other using a proprietary communications protocol. The software instructions also cause the computing system to receive an enumerate servers response from the web API. The enumerate servers response is a web services response that is responsive to the enumerate servers request. The enumerate servers response contains a display URL and a unique identifier for collaboration server components in the collaboration system. For each given collaboration server component having a unique identifier contained in the enumerate servers response, the software instructions cause the computing system to:

Send an enumerate databases request to the web API. The enumerate databases request is a web services request to invoke an enumerate databases method of the web API. The enumerate databases request specifies the unique identifier of the given collaboration server component.

Receive an enumerate databases response from the web API. The enumerate databases response is a web services response that is responsive to the enumerate databases request. The enumerate databases response contains a unique identifier and a last modified time for each database in the given collaboration server component.

For each given database in the given collaboration server component, the software instructions cause the computing system to:

Send an enumerate items request to the web API. The enumerate items request is a web services request to invoke an enumerate items method of the web API. The enumerate items request specifies the unique identifier of the given database.

Receive an enumerate items response from the web API. The enumerate items response is a web services response that is responsive to the enumerate items request. The enumerate items response contains unique identifiers for content items in the given database.

For each given content item having a unique identifier contained in the enumerate items response, the software instructions cause the computing system to:

Send a fetch item request to the web API. The fetch item request is a web services request to invoke a fetch item method of the web API. The fetch item request specifies the unique identifier of the given content item.

Receive a fetch item response from the web API. The fetch item response is a web services response that is responsive to the fetch item request. The fetch item request contains an array of unique identifiers for documents attached to the given content item, a display URL of the given content item, content of the given content item, an array of properties of the given content item, a last modified time of the given content item, and a security descriptor of the given content item.

After receiving the fetch item response, modify an index such that entries in the index map terms applicable to the given content item to the given content item.

For each given document identified in the array of unique identifiers for documents attached to the given content item, the software instructions cause the computing system to:

Send a fetch attachment request to the web API. The fetch attachment request is a web services request to invoke a fetch attachment method of the web API. The enumerate databases response contains a unique identifier of the given document.

Receive a fetch attachment response from the web API. The fetch attachment response is a web services response that is responsive to the fetch attachment request. The fetch attachment response contains contents of the given document.

Modify the index such that the index contains entries that map terms applicable to the given document to the content item.

DETAILED DESCRIPTION

Figure 1:
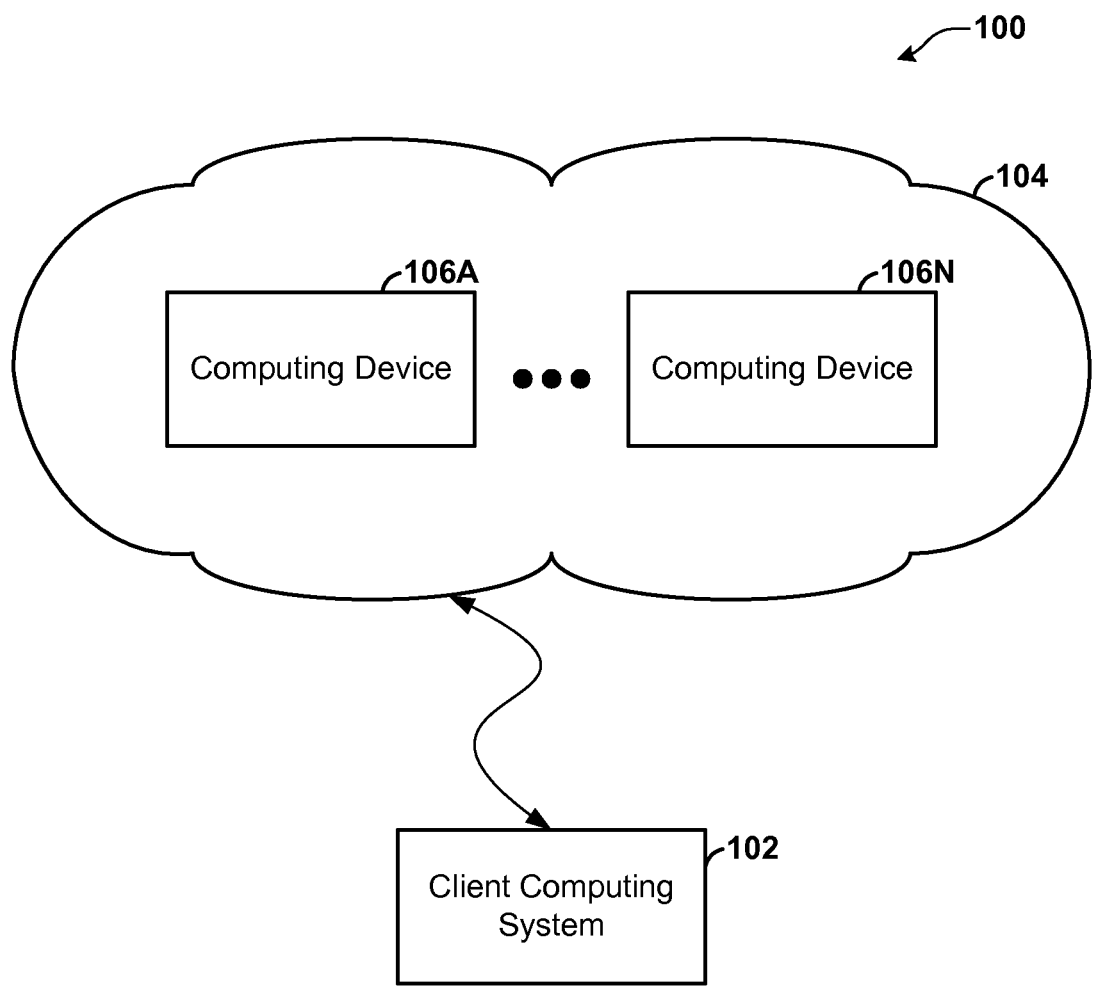
FIG. 1 is a block diagram illustrating an example system.

FIG. 1 is a block diagram illustrating an example system 100. The system 100 is merely one embodiment. Other embodiments include more or fewer computing devices, computing systems, networks, and/or other components.

The system 100 includes a client computing system 102. As used herein, a computing system is a system comprising one or more computing devices. A computing device is a physical device that computes information. In various embodiments, the client computing system 102 can comprise various types of computing devices. For example, the client computing system 102 can comprise a desktop computer, a laptop computer, a handheld computer, a mobile telephone, a television set top box, a computing device integrated into a vehicle, a game console, a standalone server device, a server blade device, a mainframe computing device, or another type of computing device.

Furthermore, the system 100 includes a network 104. The network 104 is a collection of computing devices and links that facilitate communication among the computing devices. The client computing system 102 is able to communicate with at least some of the computing devices in the network 104. In various embodiments, the network 104 includes various types of computing devices. For example, the network 104 can include routers, switches, mobile access points, bridges, hubs, intrusion detection devices, storage devices, standalone server devices, blade server devices, sensors, desktop computers, laptop computers, handheld computers, mobile telephones, and other types of computing devices. In various embodiments, the network 104 includes various types of links For example, the network 104 can include wired and/or wireless links Furthermore, in various embodiments, the network 104 is implemented at various scales. For example, the network 104 can be implemented as one or more local area networks (LANs), metropolitan area networks, subnets, wide area networks (such as the Internet), or can be implemented at another scale.

The network 104 includes computing devices 106A-106N (collectively, "computing devices 106"). In various embodiments, the computing devices 106 can be one or more types of computing devices. For example, one or more of the computing devices 106 can be standalone server devices, blade server devices, personal computers, mainframe computers, and/or other types of computing devices. In some embodiments, the computing devices 106 are operated by a single entity, such as a corporation. In other embodiments, the computing devices 106 are operated by multiple entities. Furthermore, in some embodiments, the computing devices 106 are physically co-located. For example, in some embodiments, the computing devices 106 are physically located at a server farm or a data center. In other embodiments, at least some of the computing devices 106 are geographically dispersed.

The computing devices 106 operate to provide a set of components. As used herein, a component is a functional element of a system. In various embodiments, the computing devices 106 operate to provide various components. For example, in the embodiment illustrated in the example FIG. 2, the set of components includes collaboration server components 202A-202N, a collaboration client component 204, a web services component 206, an indexer component 208, and a query component 210. In other embodiments, the computing devices 106 operate to provide components other than those illustrated in the example of FIG. 2.

In various embodiments, various ones of the components can be provided by various ones of the computing devices 106. For example, in some embodiments, each of the computing devices 106 provides one of the components. In other embodiments, a single one of the computing devices 106 provides two or more of the components.

Furthermore, in various embodiments, the computing devices 106 operate in various ways to provide the components. For example, in some embodiments, the computing devices 106 comprise computer-readable data storage media. As used herein, a computer-readable data storage medium is a device or article of manufacture that stores data. In some instances, the computer-readable data storage media are parts of a computer program product. The computer-readable data storage media store software instructions that, when executed by processing systems in the computing devices 106, cause the computing devices 106 to provide the components. In other embodiments, one or more of the computing devices 106 comprise application-specific integrated circuits (ASICs) that cause the computing devices 106 to provide the components.

As described herein, the components enable the client computing system 102 to search for content items stored in one or more databases. The databases are maintained by and exclusively accessible through one or more collaboration server components in a collaboration system. An indexer component generates an index of content items in the databases. As used herein, an index is a set of entries that map terms to content items to which the terms are applicable. To generate the index, the indexer component exchanges web services messages with a web services component that provides a web API. In response to the web services messages, the web services API invokes one or more methods of a language-dependent API of a collaboration client component in the collaboration system. The collaboration client component communicates with the collaboration server components to obtain data from a collaboration server component in the collaboration system. The collaboration client component communicates with the collaboration server components using a proprietary communications protocol.

When the collaboration client component receives the data from the collaboration server component, the collaboration client component provides the data to the web services component. The web services component then sends a web services response responsive to the web services request. The contents of the web services response depends on the data obtained from the collaboration server component. In other words, the content of the web services response is affected by the data obtained from the collaboration server component. For example, the web services response can contain the data obtained from the collaboration server component. In another example, the web services response can contain data calculated and/or identified based on the data obtained from the collaboration server component.

Figure 2:
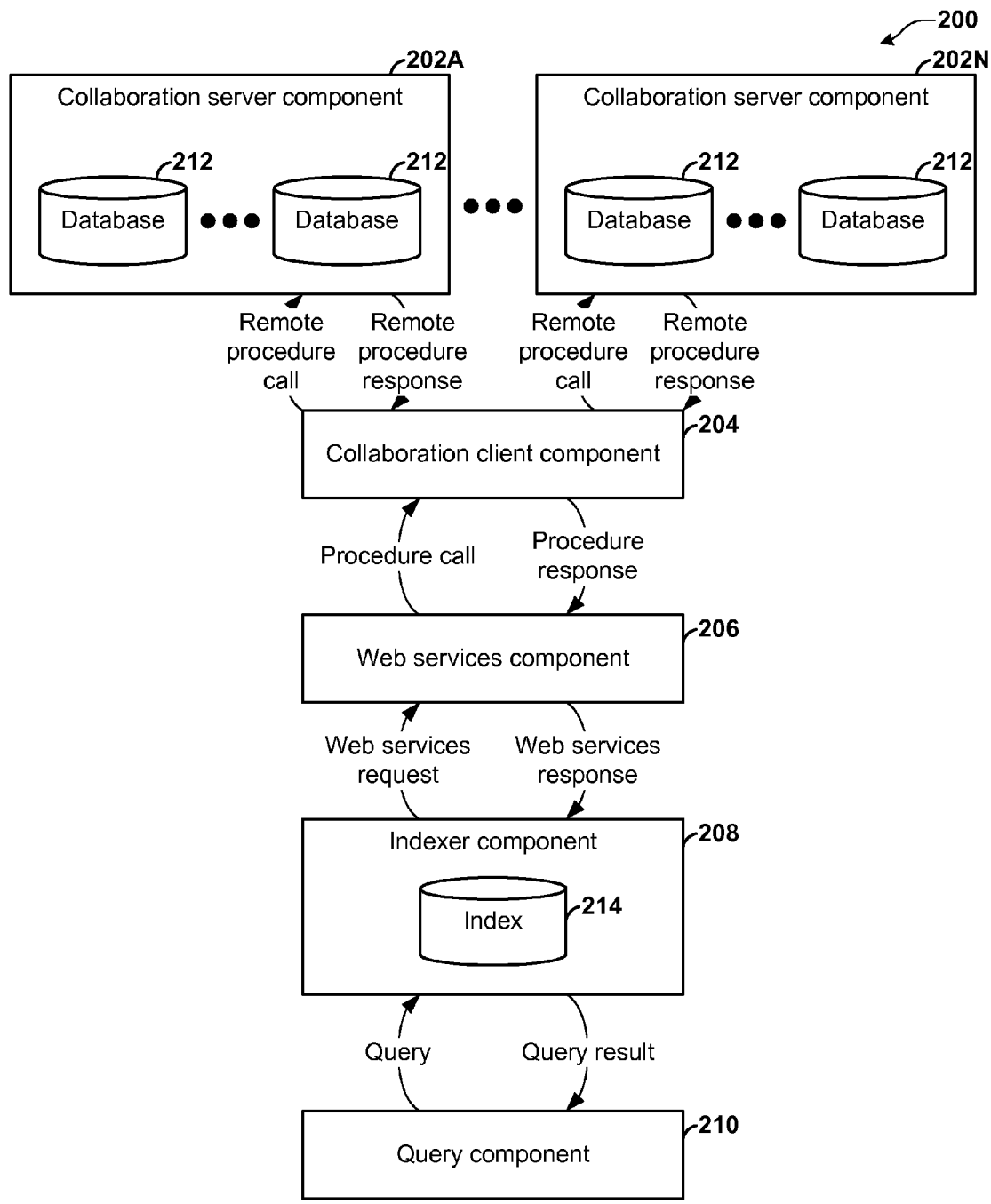
FIG. 2 is a block diagram illustrating an example system of components provided by computing devices.

FIG. 2 is a block diagram illustrating an example system 200 of components provided by the computing devices 106. The system 200 is merely one embodiment. Other embodiments include more or fewer components.

The system 200 includes collaboration server components 202A-202N (collectively, collaboration server components 202), a collaboration client component 204, a web services component 206, an indexer component 208, and a query component 210. In various embodiments, the collaboration server components 202, the collaboration client component 204, the web services component 206, the indexer component 208, and the query component 210 are provided by various ones of the computing devices 106 illustrated in the example of FIG. 1.

The collaboration server components 202 are collaboration server components of a collaboration system. A collaboration system is a software system that allows users to collaborate with each other. The collaboration server components 202 receive and store content items generated by users. Other users can use client components of the collaboration system to access content items stored by the collaboration server components 202.

The collaboration server components 202 maintain databases 212. The databases 212 store content items. The content items belong to one or more types. For example, in some embodiments, the databases 212 store e-mail messages, task list items, calendar appointments, contacts, customer-relations management data, documents, and/or other types of data. In various embodiments, the databases 212 are implemented in various ways. For example, in some embodiments, one or more of the databases 212 are implemented as general-purpose relational databases. In other embodiments, one or more of the databases 212 are implemented as Online Analytics Processing (OLAP) cubes.

Furthermore, the collaboration server components 202 provide a set of services that enable storage and retrieval of content items in the databases 212. In various embodiments, the collaboration server components 202 provide various services. For example, in some embodiments, the collaboration server components 202 provide e-mail services. The e-mail services listen for incoming e-mail messages and store the incoming e-mail messages into appropriate ones of the databases 212. In this example, the e-mail services also process requests from client applications to retrieve e-mail messages stored in the databases 212. In another example, the collaboration server components 202 provide document management services. The document management services store documents in the databases 212 and allow collaboration client components, such as collaboration client component 204, to check out and check in the documents.

In some embodiments, the collaboration server components 202 are instances of the IBM DOMINO application server. In other embodiments, the collaboration server components 202 are instances of other commercially available collaboration system servers.

The collaboration client component 204 is a client component of the collaboration system. The collaboration client component 204 uses services provided by the collaboration server components 202. In various embodiments, the collaboration client component 204 can be various types of applications. For example, in some embodiments, the collaboration client component 204 is an instance of the IBM LOTUS-NOTES e-mail client application. In another example, the collaboration client component 204 is an instance of the IBM SAMETIME unified communications and collaboration client application. Furthermore, in various embodiments, the collaboration client component 204 is implemented in various ways. For example, in some embodiments, the collaboration client component 204 is implemented as a 32-bit application.

The collaboration client component 204 communicates exclusively with the collaboration server components 202 using a proprietary communication protocol. Consequently, only client applications manufactured by or licensed by the manufacturer of the collaboration server components 202 are able to communicate with the collaboration server components 202. A proprietary protocol is a communications protocol that is controlled by one or more entities, to the exclusion of others. In some embodiments, the proprietary communications protocol comprises remote procedure calls and remote procedure responses.

Before the collaboration client component 204 is able to communicate with the collaboration server components 202, a user logs on to the collaboration client component 204. An entity that manages the collaboration system authorizes the user to access content items stored in at least some of the collaboration server components 202. When the user is not authorized to access one of the collaboration server components 202, the collaboration server component does not send information to the client component regarding content items stored in the databases in the collaboration server component. The collaboration server components 202 that the user logged-on to the collaboration client component 204 is authorized to access are referred to herein as the available collaboration server components.

The collaboration client component 204 provides a language-dependent API. In various embodiments, the language-dependent API is dependent on various programming languages. A language-dependent API is an API designed to be used by client software written in a particular programming language. For example, in some embodiments, the language-dependent API is dependent on the C++ programming language. In other embodiments, the language-dependent API is dependent on the Java programming language. The language-dependent API includes a plurality of methods. When invoked, the methods cause the collaboration client component 204 to communicate with one or more of the collaboration server components 202.

The web services component 206 provides a web service. A web service is an API (i.e., a web API) that is accessible over a network and is executed on a computing system that hosts services. The web API includes a set of methods. In various embodiments, the set of methods includes various methods. For example, in some embodiments, the web API includes an enumerate servers method, a get server method, an enumerate databases method, a get database method, an enumerate items method, a fetch item method, and a fetch attachment method. The enumerate servers method returns identifiers of available ones of the collaboration server components 202. The get server method returns data about an individual one of the collaboration server components 202. The enumerate databases method returns identifiers of available ones of the databases 212 in a given one of the collaboration server components 202. The get database method returns data about a given one of the databases 212. The enumerate items method returns identifiers of available ones of the content items in a given one of the databases 212. The fetch item method returns a given content item in one of the databases 212. The fetch attachment method returns a file attached to a given content item in one of the databases 212. In other embodiments, the web API can include more or fewer methods. Furthermore, in other embodiments, the web API can include methods having the same functionalities as these methods but having different names.

The indexer component 208 generates an index 214. The index 214 is a set of entries. Each entry maps a term to one or more content items to which the term is applicable. For example, an entry in the index 214 can map the term "blizzard" to content items that contain the term "blizzard." In another example, an entry in the index 214 can map the term "2009" to content items created in the year 2009. In this other example, the content items created in the year 2009 do not necessarily include the term "2009."

To generate the index 214, the indexer component 208 sends web services requests to the web API provided by the web services component 206. The web services requests are requests to invoke particular ones of the methods of the web API. In various embodiments, the indexer component 208 formats the web services requests in various ways. For example, in some embodiments, the indexer component 208 formats the web services requests as Hypertext Transfer Protocol (HTTP) requests containing SOAP messages. In other embodiments, the indexer component 208 formats the web services requests as HTTP requests that conform to a Representational State Transfer (REST) architecture.

Figure 3:
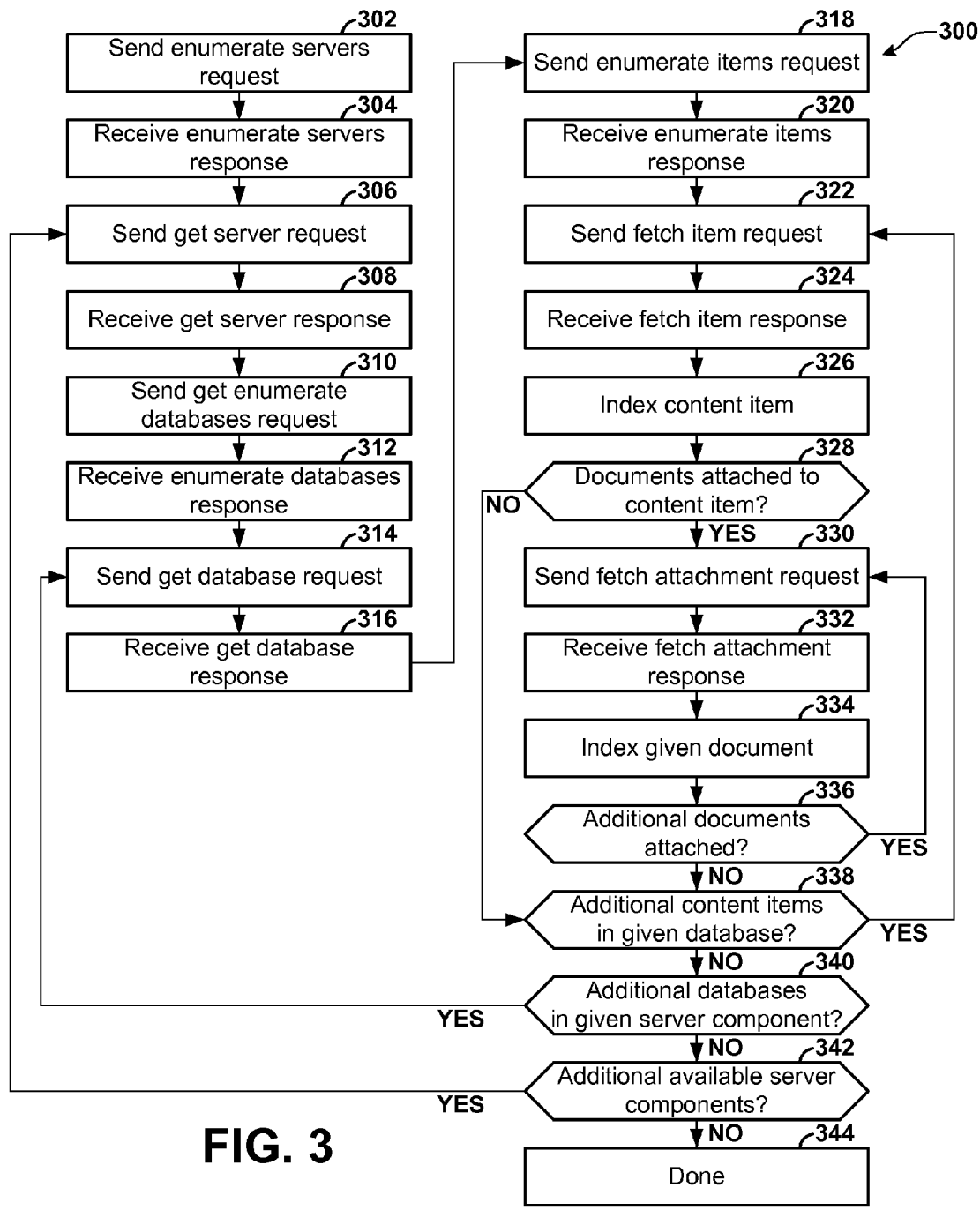
FIG. 3 is a flowchart illustrating an example operation of an indexer component to generate an index.

As described with regard to the example embodiment illustrated in FIG. 3, the indexer component 208 first sends a web services request that invokes the enumerate servers method of the web API. By invoking the enumerate servers method, the indexer component 208 obtains identifiers of available ones of the collaboration server components 202. Using the identifiers of available ones of the collaboration server components 202, the indexer component 208 sends a web services request that invokes the get server method of the web API. By invoking the get server method, the indexer component 208 obtains information that identifies a given collaboration server component among the available collaboration server components 202. Using the information that identifies the given collaboration server component, the indexer component 208 sends a web services request that invokes the enumerate databases method of the web API. By invoking the enumerate databases method, the indexer component 208 obtains identifiers of databases 212 in the given collaboration server component. Using identifiers of databases 212 in the given collaboration server component, the indexer component 208 sends web services requests that invoke the get database method of the web API. By invoking the get database method, the indexer component 208 obtains data identifying a given database among the databases in the given collaboration server component.

Next, the indexer component 208 sends a web services request that invokes the enumerate items method of the web API. By invoking the enumerate items method, the indexer component 208 obtains identifiers of content items in the given database. The indexer component 208 then sends a web services request that invokes the fetch item method of the web API. By invoking the fetch item method, the indexer component 208 obtains a copy of a given content item among the content items in the given database. Upon obtaining the given content item, the indexer component 208 identifies terms applicable to the given content item. The indexer component 208 then modifies the index 214 such that the index 214 includes entries that map the identified terms to the given content item.

When one or more documents are attached to the given content item, the indexer component 208 sends a web services request that invokes the fetch attachment method of the web API. By invoking the fetch attachment method, the indexer component 208 obtains a copy of a given document among the documents attached to the given content item. Upon receiving the given document, the indexer component 208 identifies terms applicable to the given document. The indexer component 208 then modifies the index 214 such that the index 214 includes entries that map the identified terms to the given content item.

The indexer component 208 repeats the operations described above with regard to the given document for each document attached to the given content item. Furthermore, the indexer component 208 repeats the operations described above with regard to the given content item for each content item in the given database. Furthermore, the indexer component 208 repeats the operations described above with regard to the given database for each database in the given collaboration server component. Furthermore, the indexer component 208 repeats the operations described above with regard to the given collaboration server component for each of the available ones of the collaboration server components 202. In this way, the indexer component 208 generates the index 214.

In some embodiments, the indexer component 208 is implemented as a 64-bit application. Typically, 64-bit applications are unable to communicate directly with 32-bit applications. As mentioned above, the collaboration client component 204 can be implemented as a 32-bit application. In such embodiments, exchanging messages through the web services component 206 enables the indexer component 208 to communicate with the collaboration client component 204.

The query component 210 sends queries to the indexer component 208. The queries are requests for content items that conform to particular conditions. For example, a query can request all content items that contain the word "blizzard." In another example, a query can request all content items that were created in the year "2009."

When the indexer component 208 receives a query from the query component 210, the indexer component 208 uses the index 214 to identify content items that conform to the conditions specified by the query. The indexer component 208 then sends a query result back to the query component 210. The query result specifies the content items that conform to the conditions specified by the query.

In various embodiments, the query component 210 sends a query to the indexer component 208 in response to various events. For example, in some embodiments, the query component 210 is part of a server system, such as MICROSOFT® SHAREPOINT®. In this example, the server system hosts at least one web page that allows users to search for content items. The query component 210 sends a query when a user (e.g., a user of the client computing system 102) uses the web page to describe content items for which to search. Furthermore, in this example, the query component 210 can send corresponding queries to other components when the user uses the web page to describe content items for which to search. Thus, the query from the query component 210 to the indexer component 208 can be part of a federated search.

In another example, the query component 210 is a desktop search application operating on the client computing system 102. In this example, the query component 210 provides a graphical user interface to a user of the client computing system 102. The user uses the graphical user interface to provide a description of content items for which to search. In this example, the query component 210 sends a query to the indexer component 208 in response to receiving the description of the content items.

FIG. 3 is a flowchart illustrating an example operation 300 of the indexer component 208 to generate the index 214. In some embodiments, the indexer component 208 performs the operation 300 to generate the index 214. In other embodiments, the indexer component 208 performs other operations to generate the index 214. Such other operations can include more or fewer steps than the operation 300. Furthermore, such other operations can include the steps of the operation 300 in a different sequence.

As illustrated in the example of FIG. 3, the operation 300 begins when the indexer component 208 sends an enumerate servers request to the web API provided by the web services component 206 (302). The enumerate servers request is a web services request to invoke the enumerate servers method of the web API. In various embodiments, the enumerate servers request is formatted in various ways. For example, in some embodiments, the enumerate servers request is formatted as a SOAP request. The SOAP request comprises an EnumerateServers element. The following is one example enumerate servers request:

```
<s:Envelope xmlns:s="http://schemas.xmlsoap.org/soap/envelope/">
    <s:Header>
        <To s:mustUnderstand="1"
            xmlns="http://schemas.microsoft.com/ws/
            2005/05/addressing/none">
http://example.com:32843/1ade1128945745dfbb3ceebc2b22df7b/
NotesWebService.svc
        </To>
        <Action s:mustUnderstand="1"
            xmlns="http://schemas.microsoft.com/ws/2005/05/
            addressing/none">
            http://tempuri.org/INotesWebServiceApplication/
            EnumerateServers
        </Action>
    </s:Header>
    <s:Body>
        <EnumerateServers xmlns="http://tempuri.org/">
        </EnumerateServers>
    </s:Body>
</s:Envelope>
```

Subsequently, the indexer component 208 receives an enumerate servers response from the web API (304). The enumerate servers response is a web services response that is responsive to the enumerate servers request. The enumerate servers response contains identifiers of the available ones of the collaboration server components 202. In various embodiments, the enumerate servers response is formatted in various ways. For example, in some embodiments, the enumerate servers response is formatted as a SOAP response. The SOAP response comprises an EnumerateServersResponse element. The EnumerateServersResponse element contains a sequence of EnumerateServersResult elements. Each of the EnumerateServersResult elements contains a unique identifier and a display URL for an available one of the collaboration server components 202. A unique identifier is an identifier that uniquely identifies one of the collaboration server components 202. A display URL is a URL that is displayed on a search results page and that is associated with one of the collaboration server components 202. The following is one example enumerate servers response:

```
<s:Envelope xmlns:s="http://schemas.xmlsoap.org/soap/envelope/">
    <s:Header>
        <Action s:mustUnderstand="1"
            xmlns="http://schemas.microsoft.com/ws/2005/05/
            addressing/none">
http://tempuri.org/INotesWebServiceApplication/
EnumerateServersResponse
        </Action>
    </s:Header>
    <s:Body>
        <EnumerateServersResponse xmlns="http://tempuri.org/">
            <EnumerateServersResult
xmlns:d4p1="http://schemas.datacontract.org/2004/07/
Microsoft.Office.Server.Search.Administration"
xmlns:i="http://www.w3.org/2001/XMLSchema-instance">
                <d4p1:SERVERITEM>
                    <d4p1:displayUrl>http://example.net
                    </d4p1:displayUrl>
                    <d4p1:serverId>exampleserver1</d4p1:serverId>
                </d4p1:SERVERITEM>
                <d4p1:SERVERITEM>
                    <d4p1:displayUrl>http://example.org
                    </d4p1:displayUrl>
                    <d4p1:serverId>exampleserver2</d4p1:serverId>
                </d4p1:SERVERITEM>
            </EnumerateServersResult>
        </EnumerateServersResponse>
    </s:Body>
</s:Envelope>
```

After receiving the enumerate servers response, the indexer component 208 sends a get server request to the web API (306). The get server request is a web services request to invoke the get server method of the web API. The get server request specifies a unique identifier of a given collaboration server component. The given collaboration server component is one of the available ones of the collaboration server components 202. In various embodiments, the get server request is formatted in various ways. For example, in some embodiments, the get server request is formatted as a SOAP request. The SOAP request comprises a GetServer element that contains a ServerName element that specifies the unique identifier of the given collaboration server component.

Subsequently, the indexer component 208 receives a get server response from the web API (308). The get server response is a web services response that is responsive to the get server request. The get server response contains a unique identifier and a display URL for the given collaboration server component. In various embodiments, the get server response is formatted in various ways. For example, in some embodiments, the get server response is formatted as a SOAP response. The SOAP response comprises a GetServerResponse element. The GetServerResponse element contains a GetServerResult element that specifies a unique identifier and a display URL of given collaboration server component.

After receiving the get server response, the indexer component 208 sends an enumerate databases request to the web API (310). The enumerate databases request is a web services request to invoke the enumerate databases method of the web API. The enumerate databases request specifies the unique identifier of the given collaboration server component specified by the get server response. Furthermore, in some embodiments, the enumerate databases request can specify a unique identifier of a last seen database. In various embodiments, the enumerate databases request is formatted in various ways. For example, in some embodiments, the enumerate databases request is formatted as a SOAP request. The SOAP request comprises an EnumerateDatabases element that contains a ServerName element and a LastSeenDatabase element. The ServerName element specifies a unique identifier of the given collaboration server component. The LastSeenDatabase element specifies the unique identifier of the last seen database in the given collaboration server component. The following is one example enumerate databases request:

```
<s:Envelope xmlns:s="http://schemas.xmlsoap.org/soap/envelope/">
    <s:Header>
        <To s:mustUnderstand="1"
xmlns="http://schemas.microsoft.com/ws/2005/05/addressing/none">
http://example.com:32843/1ade1128945745dfbb3ceebc2b22df7b/
NotesWebService.svc
        </To>
        <Action s:mustUnderstand="1"
xmlns="http://schemas.microsoft.com/ws/2005/05/addressing/none">
http://tempuri.org/INotesWebServiceApplication/EnumerateDatabases
``` merate databases response is a web services response that is responsive to the enumerate databases request. If the enumerate databases request does not specify a unique identifier of a last seen database, the enumerate databases response contains unique identifiers of databases in the given collaboration server component. If the enumerate databases request specifies a unique identifier of a last seen database, the enumerate databases response contains a unique identifiers of databases in the given collaboration server component having unique identifiers greater than the unique identifier of the last seen database.

In various embodiments, the enumerate databases response is formatted in various ways. For example, in some embodiments, the enumerate databases response is formatted as a SOAP response. The SOAP response comprises an EnumerateDatabasesResponse element. The EnumerateDatabasesResponse element includes a sequence of DatabaseItemId elements. Each of the DatabaseItemId elements specifies a unique identifier and a last modified time for a database in the given collaboration server component. The following is one example enumerate databases response:

```
<s:Envelope xmlns:s="http://schemas.xmlsoap.org/soap/envelope/">
    <s:Header>
        <Action s:mustUnderstand="1"
xmlns="http://schemas.microsoft.com/ws/2005/05/addressing/none">
http://tempuri.org/INotesWebServiceApplication/EnumerateDatabasesResponse
        </Action>
    </s:Header>
    <s:Body>
        <EnumerateDatabasesResponse xmlns="http://tempuri.org/">
            <EnumerateDatabasesResult
xmlns:d4p1="http://schemas.datacontract.org/2004/07/Microsoft.Office.Server.-
Search.Administration"
xmlns:i="http://www.w3.org/2001/XMLSchema-instance">
                <d4p1:DATABASEITEMID>
                    <d4p1:databaseId>exampleserver1\Database1.nsf</d4p1:databaseId>
                    <d4p1:lastModifiedTime>2009-05-
21T20:11:35</d4p1:lastModifiedTime>
                </d4p1:DATABASEITEMID>
                <d4p1:DATABASEITEMID>
                    <d4p1:databaseId>exampleserver1\Database2.nsf</d4p1:databaseId>
                    <d4p1:lastModifiedTime>2008-04-12T02:00:44</d4p1:lastModifiedTime>
                </d4p1:DATABASEITEMID>
                <d4p1:DATABASEITEMID>
                    <d4p1:databaseId>exampleserver1\Database3.nsf</d4p1:databaseId>
                    <d4p1:lastModifiedTime>2009-05-19T02:00:05</d4p1:lastModifiedTime>
                </d4p1:DATABASEITEMID>
                <d4p1:DATABASEITEMID>
                    <d4p1:databaseId>exampleserver1\Database4.nsf</d4p1:databaseId>
                    <d4p1:lastModifiedTime>2007-11-19T21:17:58</d4p1:lastModifiedTime>
                </d4p1:DATABASEITEMID>
            </EnumerateDatabasesResult>
        </EnumerateDatabasesResponse>
    </s:Body>
</s:Envelope>
```

-continued

```
        </Action>
    </s:Header>
    <s:Body>
        <EnumerateDatabases xmlns="http://tempuri.org/">
            <serverName>exampleserver1</serverName>
            <lastSeenDatabase></lastSeenDatabase>
        </EnumerateDatabases>
    </s:Body>
</s:Envelope>
```

Subsequently, the indexer component 208 receives an enumerate databases response from the web API (312). The enu- After receiving the enumerate databases response, the indexer component 208 sends a get database request (314). The get database request is a web services request to invoke the get database method of the web API. The get database request specifies a unique identifier of a given database. The given database is one of the databases in the given collaboration server component. In various embodiments, the get database request is formatted in various ways. For example, in some embodiments, the get database request is formatted as a SOAP request. The SOAP request comprises a GetDatabase element that contains a DatabaseName element. The DatabaseName element specifies the unique identifier of the given database. The following is one example get database request:

```
<s:Envelope xmlns:s="http://schemas.xmlsoap.org/soap/envelope/">
    <s:Header>
        <To s:mustUnderstand="1"
xmlns="http://schemas.microsoft.com/ws/2005/05/addressing/none">
http://example.com:32843/1ade1128945745dfbb3ceebc2b22df7b/
NotesWebService.svc
        </To>
        <Action s:mustUnderstand="1"
xmlns="http://schemas.microsoft.com/ws/2005/05/addressing/none">
http://tempuri.org/INotesWebServiceApplication/GetDatabase
        </Action>
    </s:Header>
    <s:Body>
        <GetDatabase xmlns="http://tempuri.org/">
            <databaseName>exampleserver1\Database3.nsf
            </databaseName>
        </GetDatabase>
    </s:Body>
</s:Envelope>
```

Subsequently, the indexer component 208 receives a get database response from the web API (316). The get database response is a web services response that is responsive to the get database request. The get database response specifies a unique identifier of the given database, a display URL of the given database, a last modified time of the given database, and a security descriptor of the given database. The security descriptor of the given database is a data structure that contains security information associated with the given database. The security information indicates which users are allowed to access the given database.

In various embodiments, the get database response is formatted in various ways. For example, in some embodiments, the get database response is formatted as a SOAP response. The SOAP response comprises a GetDatabaseResponse element that contains a GetDatabaseResult element. The GetDatabaseResult element includes a DatabaseId element, a DisplayURL element, a LastModifiedTime element, and a SecurityDesc element. The DatabaseId element specifies the unique identifier of the given database. The DisplayURL element specifies a display URL of the given database. The LastModifiedTime element specifies a last time that the given database was modified. The SecurityDesc element specifies a security descriptor for the given database. The security descriptor for the given database indicates which users are authorized to access the given database. The following is one example get database response:

```
<s:Envelope xmlns:s="http://schemas.xmlsoap.org/soap/envelope/">
    <s:Header>
        <Action s:mustUnderstand="1"
xmlns="http://schemas.microsoft.com/ws/2005/05/addressing/none">
http://tempuri.org/INotesWebServiceApplication/GetDatabaseResponse
        </Action>
    </s:Header>
    <s:Body>
        <GetDatabaseResponse xmlns="http://tempuri.org/">
            <GetDatabaseResult
xmlns:d4p1="http://schemas.datacontract.org/2004/07/
Microsoft.Office.Server.Search.Administration"
xmlns:i="http://www.w3.org/2001/XMLSchema-instance">
                <d4p1:databaseId>exampleserver1\Database3.nsf
                </d4p1:databaseId>
                <d4p1:displayUrl>
                http://exampleserver1\Database3.nsf/
                </d4p1:displayUrl>
                <d4p1:lastModifiedTime>2009-04-08T13:23:19
                </d4p1:lastModifiedTime>
                <d4p1:securityDesc>
                    <d4p1:SD></d4p1:SD>
                    <d4p1:isNTSD>true</d4p1:isNTSD>
                </d4p1:securityDesc>
            </GetDatabaseResult>
        </GetDatabaseResponse>
    </s:Body>
</s:Envelope>
```

After receiving the get database response, the indexer component 208 sends an enumerate items request (318). The enumerate items request is a web services request to invoke the enumerate items method of the web API. The enumerate items request specifies a unique identifier of the given database. Furthermore, in some embodiments, the enumerate items request can specify a unique identifier of a last seen content item in the given database. In various embodiments, the enumerate items request is formatted in various ways. For example, in some embodiments, the enumerate items request is formatted as a SOAP request. The SOAP request comprises an EnumerateItems element that can contain a DatabasePath element and a LastSeenItem element. The DatabasePath element specifies the unique identifier of the given database. The LastSeenItem element specifies the unique identifier of the last seen item in the given database. The following is one example enumerate items request:

```
<s:Envelope xmlns:s="http://schemas.xmlsoap.org/soap/envelope/">
    <s:Header>
        <To s:mustUnderstand="1"
xmlns="http://schemas.microsoft.com/ws/2005/05/addressing/none">
http://example.com:32843/1ade1128945745dfbb3ceebc2b22df7b/
NotesWebService.svc
        </To>
        <Action s:mustUnderstand="1"
xmlns="http://schemas.microsoft.com/ws/2005/05/addressing/none">
http://tempuri.org/INotesWebServiceApplication/EnumerateItems
        </Action>
    </s:Header>
    <s:Body>
        <EnumerateItems xmlns="http://tempuri.org/">
<databasePath>exampleserver1\Database3.nsf</databasePath>
            <lastSeenItem></lastSeenItem>
        </EnumerateItems>
    </s:Body>
</s:Envelope>
```

Subsequently, the indexer component 208 receives an enumerate items response from the web API (320). The enumerate items response is a web services response that is responsive to the enumerate items request. If the enumerate items request does not specify a unique identifier of a last seen content item in the given database, the enumerate item response contains unique identifiers of the content items in the given database. If the enumerate items request specifies a unique identifier of a last seen content item in the given database, the enumerate item response contains unique identifiers of content items in the given database having unique identifiers greater than the unique identifier of the last seen content item in the given database.

In various embodiments, the enumerate items response is formatted in various ways. For example, in some embodiments, the enumerate items response is formatted as a SOAP response. The SOAP response comprises an EnumerateItemsResponse element that contains a sequence of EnumerateItemsResults elements. Each of the EnumerateItemsResults elements is allowed to specify an AttachmentId element, a DisplayURL element, an ItemContent element, an ItemId element, an ItemProps element, a LastModifiedTime element, and a SecurityDesc element. If present, the AttachmentID element specifies an array of unique identifiers of documents attached to a content item. The DisplayURL element specifies a display URL of the content item. The ItemContent element specifies the content of the content item. The ItemId element specifies a unique identifier of the content item. The ItemProps element specifies an array of properties of the content item. The LastModifiedTime element specifies a last time that the content item was modified. The SecurityDesc element specifies a security descriptor for the content item. The security descriptor for the content item indicates which users are allowed to access the content item. When a user that originates a query to the indexer component 208 is not allowed to access the content item, the indexer component 208 does not return the content item in response to the query.

The following is one example enumerate items response:

```
<s:Envelope xmlns:s="http://schemas.xmlsoap.org/soap/envelope/">
    <s:Header>
        <Action s:mustUnderstand="1"
xmlns="http://schemas.microsoft.com/ws/2005/05/addressing/none">
http://tempuri.org/INotesWebServiceApplication/EnumerateItemsResponse
        </Action>
    </s:Header>
    <s:Body>
        <EnumerateItemsResponse xmlns="http://tempuri.org/">
            <EnumerateItemsResult
xmlns:d4p1="http://schemas.datacontract.org/2004/07/
Microsoft.Office.Server.Search.Administration"
xmlns:i="http://www.w3.org/2001/XMLSchema-instance">
                <d4p1:NOTESITEM>
                    <d4p1:attachmentId i:nil="true">
                    </d4p1:attachmentId>
                    <d4p1:displayUrl>
http://exampleserver1/Database3.nsf/$DEFAULTVIEW/
607a4ee77cd137d2082574a50076fb68</d4p1:displayUrl>
                    <d4p1:itemContent>
                        <d4p1:content i:nil="true"></d4p1:content>
                        <d4p1:contentType i:nil="true">
                        </d4p1:contentType>
                        <d4p1:extension i:nil="true">
                        </d4p1:extension>
                    </d4p1:itemContent>
                    <d4p1:itemId>
exampleserver1\Database3.nsf\607a4ee77cd137d2082574a50076fb68
</d4p1:itemId>
                    <d4p1:itemProps i:nil="true"></d4p1:itemProps>
                    <d4p1:lastModifiedTime>2009-04-
08T13:23:19</d4p1:lastModifiedTime>
                    <d4p1:securityDesc>
                        <d4p1:SD i:nil="true"></d4p1:SD>
                        <d4p1:isNTSD>false</d4p1:isNTSD>
                    </d4p1:securityDesc>
                </d4p1:NOTESITEM>
            </EnumerateItemsResult>
        </EnumerateItemsResponse>
    </s:Body>
</s:Envelope>
```

In some embodiments, the EnumerateItemResults elements only include ItemId elements in responses to enumerate item requests even though the EnumerateItemResults elements is allowed to specify an AttachmentId element, a DisplayURL element, an ItemContent element, an ItemId element, an ItemProps element, a LastModifiedTime element, and a SecurityDesc element. Only including ItemId elements in enumerate items responses can reduce the sizes of the enumerate items responses.

After receiving the enumerate items response, the indexer component 208 sends a fetch item request (322). The fetch item request is a web services request to invoke the fetch item method of the web API. The fetch item request specifies a unique identifier of a given content item in the given database. In various embodiments, the fetch item request is formatted in various ways. For example, in some embodiments, the fetch item request is formatted as a SOAP request. The SOAP request comprises a FetchItem element that contains an ItemId element. The ItemId element specifies the unique identifier of the given content item. The following is one example fetch item request:

```
<s:Envelope xmlns:s="http://schemas.xmlsoap.org/soap/envelope/">
    <s:Header>
        <To s:mustUnderstand="1"
xmlns="http://schemas.microsoft.com/ws/2005/05/addressing/none">
http://example.com:32843/1ade1128945745dfbb3ceebc2b22df7b/
NotesWebService.svc
        </To>
        <Action s:mustUnderstand="1"
xmlns="http://schemas.microsoft.com/ws/2005/05/addressing/none">
http://tempuri.org/INotesWebServiceApplication/FetchItem
        </Action>
    </s:Header>
    <s:Body>
        <FetchItem xmlns="http://tempuri.org/">
            <itemId>
exampleserver1\Database3.nsf\607a4ee77cd137d2082574a50076fb68
            </itemId>
        </FetchItem>
    </s:Body>
</s:Envelope>
```

Subsequently, the indexer component 208 receives a fetch item response from the web API (324). The fetch item response is a web services response that is responsive to the fetch item request. The fetch item response specifies an array of unique identifiers for documents attached to the given content item, a display URL of the given content item, the content of the given content item, a unique identifier of the given content item, an array of properties of the given content item, a last modified time of the given content item, and a security descriptor of the given content item. In various embodiments, the array of properties includes various properties. For example, when the given content item is a word processor document, the array of properties can include a size property, a number of words, property, a date created property, a date edited property, and other types of properties associated with word processor documents. In another example, when the given content item is an e-mail message, the array of properties can include a date sent property, a subject property, a to property, a from property, and other types of properties associated with e-mail messages. The following is one example fetch item response:

```
<s:Envelope xmlns:s="http://schemas.xmlsoap.org/soap/envelope/">
    <s:Header>
        <Action s:mustUnderstand="1"
xmlns="http://schemas.microsoft.com/ws/2005/05/addressing/none">
http://tempuri.org/INotesWebServiceApplication/FetchItemResponse
        </Action>
    </s:Header>
```

```
        <s:Body>
            <FetchItemResponse xmlns="http://tempuri.org/">
                <FetchItemResult
xmlns:d4p1="http://schemas.datacontract.org/2004/07/Microsoft.Office.Server.-
Search.Administration"
xmlns:i="http://www.w3.org/2001/XMLSchema-instance">
                    <d4p1:attachmentId>
                        <d4p1:NOTESATTACHMENTID>
                            <d4p1:attachmentName>someattachment.txt</d4p1:attachmentName>
                            <d4p1:itemId>
exampleserver1\Database3.nsf\607a4ee77cd137d2082574a50076fb68
                            </d4p1:itemId>
                        </d4p1:NOTESATTACHMENTID>
                    </d4p1:attachmentId>
                    <d4p1:displayUrl>
http://exampleserver1/Database3.nsf/$DEFAULTVIEW/607a4ee77cd137d2082574a50076fb68
                    </d4p1:displayUrl>
                    <d4p1:itemContent>
                        <d4p1:content></d4p1:content>
                        <d4p1:contentType i:nil="true"></d4p1:contentType>
                        <d4p1:extension>txt</d4p1:extension>
                    </d4p1:itemContent>
                    <d4p1:itemId>
exampleserver1\Database3.nsf\607a4ee77cd137d2082574a50076fb68
                    </d4p1:itemId>
                    <d4p1:itemProps>
                        <d4p1:PROPERTY>
                            <d4p1:Name>Authors__C</d4p1:Name>
                            <d4p1:Value xmlns:d7p1="http://www.w3.org/2001/XMLSchema"
i:type="d7p1:string">Authors__C</d4p1:Value>
                        </d4p1:PROPERTY>
                        <d4p1:PROPERTY>
                            <d4p1:Name>Names__C</d4p1:Name>
                            <d4p1:Value xmlns:d7p1="http://www.w3.org/2001/XMLSchema"
i:type="d7p1:string">Names__C</d4p1:Value>
                        </d4p1:PROPERTY>
                        <d4p1:PROPERTY>
                            <d4p1:Name>$Readers</d4p1:Name>
                            <d4p1:Value xmlns:d7p1="http://www.w3.org/2001/XMLSchema"
i:type="d7p1:string">
                                LotusDepositors
                                LotusSubReaders
                                LotusAuthors
                                LotusManagers
                                LotusDesigners
                            </d4p1:Value>
                        </d4p1:PROPERTY>
                    </d4p1:itemProps>
                    <d4p1:lastModifiedTime>2009-04-08T13:23:19</d4p1:lastModifiedTime>
                    <d4p1:securityDesc>
                        <d4p1:SD></d4p1:SD>
                        <d4p1:isNTSD>true</d4p1:isNTSD>
                    </d4p1:securityDesc>
                </FetchItemResult>
            </FetchItemResponse>
        </s:Body>
</s:Envelope>
```

After receiving the fetch item response, the indexer component 208 modifies the index 214 such that the index 214 contains entries that map terms that are applicable to the given content item to the given content item (326). In other words, the indexer component 208 indexes the given content item. To identify terms applicable to the given content item, the indexer component 208 identifies terms in the content of the given content item and values of properties in the array of properties contained in the fetch item response.

Next, the indexer component 208 determines whether there are any documents attached to the given content item (328). In some embodiments, the indexer component 208 determines that there are one or more documents attached to the given content item when the fetch item response contains an array of unique identifiers for documents attached to the given content item.

If there are one or more documents attached to the given content item ("YES" of 328), the indexer component 208 sends a fetch attachment request (330). The fetch attachment request is a web services request to invoke the fetch attachment method of the web API. The fetch attachment request specifies a unique identifier of the given content item. In addition, the fetch attachment request specifies an attachment name. The attachment name specifies a unique identifier of a given document attached to the given content item. In various embodiments, the fetch attachment request is formatted in various ways. For example, in some embodiments, the fetch attachment request is formatted as a SOAP request. The SOAP request comprises a FetchAttachment element that contains an ItemId element and an AttachmentName element. The ItemId element specifies the unique identifier of the given content item. The AttachmentName element specifies the unique identifier of the given document attached to the given content item. The following is one example fetch attachment request:

```
<s:Envelope xmlns:s="http://schemas.xmlsoap.org/soap/envelope/">
    <s:Header>
        <To s:mustUnderstand="1"
xmlns="http://schemas.microsoft.com/ws/2005/05/addressing/none">
http://example.com:32843/1ade1128945745dfbb3ceebc2b22df7b/
NotesWebService.svc
        </To>
        <Action
s:mustUnderstand="1"
xmlns="http://schemas.microsoft.com/ws/2005/05/addressing/none">
http://tempuri.org/INotesWebServiceApplication/FetchAttachment
        </Action>
    </s:Header>
    <s:Body>
        <FetchAttachment xmlns="http://tempuri.org/">
            <itemId>
exampleserver1\Database3.nsf\607a4ee77cd137d2082574a50076fb68
</itemId>
            <attachmentName>someattachment.txt</attachmentName>
        </FetchAttachment>
    </s:Body>
</s:Envelope>
```

Subsequently, the indexer component 208 receives a fetch attachment response (332). The fetch attachment response is a web services response that is responsive to the fetch attachment request. The fetch item response contains the contents of the given document attached to the given content item. In various embodiments, the fetch attachment response is formatted in various ways. For example, in some embodiments, the fetch attachment response is formatted as a SOAP response. The SOAP response comprises a FetchAttachmentResponse element that contains a FetchAttachmentResult element. The FetchAttachmentResult element contains the given document attached to the given content item. The following is one example fetch attachment response:

```
<s:Envelope xmlns:s="http://schemas.xmlsoap.org/soap/envelope/">
    <s:Header>
        <Action s:mustUnderstand="1"
xmlns="http://schemas.microsoft.com/ws/2005/05/addressing/none">
http://tempuri.org/INotesWebServiceApplication/
FetchAttachmentResponse
        </Action>
    </s:Header>
    <s:Body>
        <FetchAttachmentResponse xmlns="http://tempuri.org/">
            <FetchAttachmentResult
xmlns:d4p1="http://schemas.datacontract.org/2004/07/
Microsoft.Office.Server.Search.Administration"
xmlns:i="http://www.w3.org/2001/XMLSchema-instance">
                <d4p1:attachmentContent>
                    <d4p1:content></d4p1:content>
                    <d4p1:contentType i:nil="true">
                    </d4p1:contentType>
                    <d4p1:extension>txt</d4p1:extension>
                </d4p1:attachmentContent>
                <d4p1:attachmentId>
                    <d4p1:attachmentName>someattachment.txt
                    </d4p1:attachmentName>
                    <d4p1:itemId>
exampleserver1\Database3.nsf\607a4ee77cd137d2082574a50076fb68
                    </d4p1:itemId>
                </d4p1:attachmentId>
            </FetchAttachmentResult>
        </FetchAttachmentResponse>
    </s:Body>
</s:Envelope>
```

After receiving the fetch attachment response, the indexer component 208 modifies the index 214 such that the index 214 contains entries that map terms that are applicable to the given document to the given content item (334). Thus, when a term is applicable to the given document, the index 214 can contain an entry that maps the term to the given content item. To identify terms applicable to the given document, the indexer component 208 identifies terms contained in the given document.

The indexer component 208 then determines whether there are any additional documents attached to the given content item (336). If there are one or more additional documents attached to the given content item ("YES" of 336), the indexer component 208 repeats steps 330-336 with regard to one of the additional documents attached to the given content item. In this way, the indexer component 208 indexes each of the documents attached to the given content item.

When there are no documents attached to the given content item ("NO" of 328) or when there are no additional documents attached to the given content item ("NO" of 336), the indexer component 208 determines whether there are any additional content items in the given database (338). If there are one or more additional content items in the given database ("YES" of 338), the indexer component 208 repeats steps 322-338 with regard to one of the additional content items in the given database. In this way, the indexer component 208 indexes each of the content items in the given database.

When there are no additional content items in the given database ("NO" of 338), the indexer component 208 determines whether there any additional databases in the given collaboration server component (340). If there are one or more additional databases in the given collaboration server component ("YES" of 340), the indexer component 208 repeats steps 314-340 with regard to one of the additional databases in the given server. In this way, the indexer component 208 indexes the content items in each of the databases in the given collaboration server component.

When there are no additional databases in the given server ("NO" of 340), the indexer component 208 determines whether there are any additional available collaboration server components (342). If there are one or more additional available collaboration server components ("YES" of 342), the indexer component 208 repeats steps 306-342 with regard to one of the additional available collaboration server components. In this way, the indexer component 208 indexes the content items in each of the databases in each of the available collaboration server components.

When there are no additional available collaboration server components ("NO" of 342), the indexer component 208 has finished indexing each content item in each database in each of the available collaboration server components (344).

Figure 4:
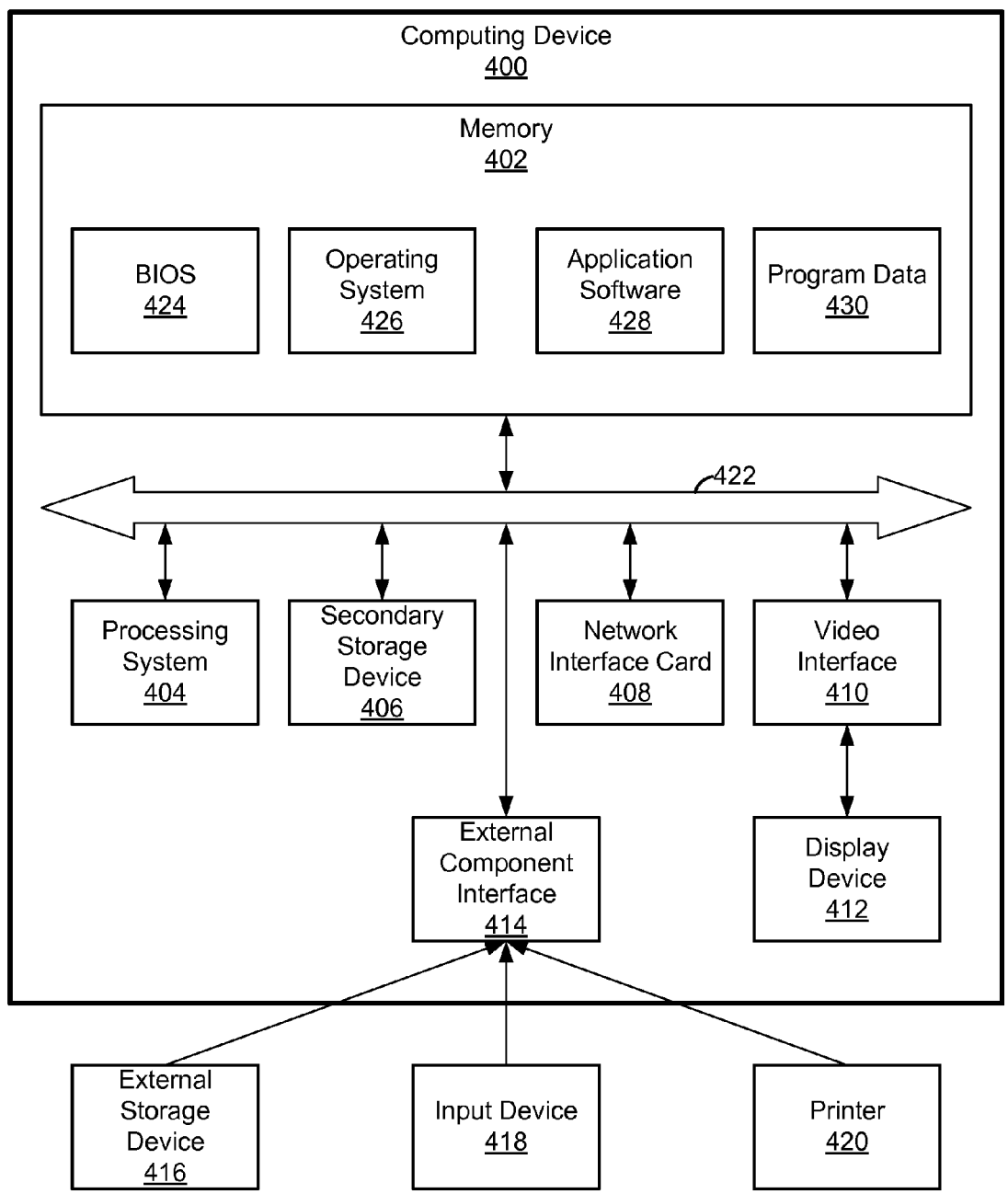
FIG. 4 is a block diagram illustrating an example computing device usable in the system.

FIG. 4 is a block diagram illustrating an example computing device 400 usable in the system 100. In some embodiments, the client computing system 102 and the computing devices 106 are implemented using one or more computing devices like the computing device 400. It should be appreciated that in other embodiments, the client computing system 102 and the computing devices 106 are implemented using computing devices having hardware components other than those illustrated in the example of FIG. 4.

In different embodiments, computing devices are implemented in different ways. For instance, in the example of FIG. 4, the computing device 400 comprises a memory 402, a processing system 404, a secondary storage device 406, a network interface card 408, a video interface 410, a display device 412, an external component interface 414, an external storage device 416, an input device 418, a printer 420, and a communication medium 422. In other embodiments, computing devices are implemented using more or fewer hardware components. For instance, in another example embodiment, a computing device does not include a video interface, a display device, an external storage device, or an input device.

The memory 402 includes one or more computer-readable data storage media capable of storing data and/or instructions. In different embodiments, the memory 402 is implemented in different ways. For instance, in various embodiments, the memory 402 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing system 404 includes one or more physical integrated circuits that selectively execute software instructions. In various embodiments, the processing system 404 is implemented in various ways. For instance, in one example embodiment, the processing system 404 is implemented as one or more processing cores. For instance, in this example embodiment, the processing system 404 may be implemented as one or more Intel Core 2 microprocessors. In another example embodiment, the processing system 404 is implemented as one or more separate microprocessors. In yet another example embodiment, the processing system 404 is implemented as an ASIC that provides specific functionality. In yet another example embodiment, the processing system 404 provides specific functionality by using an ASIC and by executing software instructions.

In different embodiments, the processing system 404 executes software instructions in different instruction sets. For instance, in various embodiments, the processing system 404 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 406 includes one or more computer-readable data storage media. The secondary storage device 406 stores data and software instructions not directly accessible by the processing system 404. In other words, the processing system 404 performs an I/O operation to retrieve data and/or software instructions from the secondary storage device 406. In various embodiments, the secondary storage device 406 is implemented by various types of computer-readable data storage media. For instance, the secondary storage device 406 may be implemented by one or more magnetic disks, magnetic tape drives, CD-ROM discs, DVD-ROM discs, Blu-Ray discs, solid state memory devices, Bernoulli cartridges, and/or other types of computer-readable data storage media.

The network interface card 408 enables the computing device 400 to send data to and receive data from a computer communication network. In different embodiments, the network interface card 408 is implemented in different ways. For example, in various embodiments, the network interface card 408 is implemented as an Ethernet interface, a token-ring network interface, a fiber optic network interface, a wireless network interface (e.g., WiFi, WiMax, etc.), or another type of network interface.

The video interface 410 enables the computing device 400 to output video information to the display device 412. In different embodiments, the video interface 410 is implemented in different ways. For instance, in one example embodiment, the video interface 410 is integrated into a motherboard of the computing device 400. In another example embodiment, the video interface 410 is a video expansion card. Example types of video expansion cards include Radeon graphics cards manufactured by ATI Technologies, Inc. of Markham, Ontario, Geforce graphics cards manufactured by Nvidia Corporation of Santa Clara, Calif., and other types of graphics cards.

In various embodiments, the display device 412 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 410 communicates with the display device 412 in various ways. For instance, in various embodiments, the video interface 410 communicates with the display device 412 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 414 enables the computing device 400 to communicate with external devices. In various embodiments, the external component interface 414 is implemented in different ways. For instance, in one example embodiment, the external component interface 414 is a USB interface. In other example embodiments, the computing device 400 is a FireWire interface, a serial port interface, a parallel port interface, a PS/2 interface, and/or another type of interface that enables the computing device 400 to communicate with external components.

In different embodiments, the external component interface 414 enables the computing device 400 to communicate with different external components. For instance, in the example of FIG. 4, the external component interface 414 enables the computing device 400 to communicate with the external storage device 416, the input device 418, and the printer 420. In other embodiments, the external component interface 414 enables the computing device 400 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 400.

The external storage device 416 is an external component comprising one or more computer readable data storage media. Different implementations of the computing device 400 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 418 is an external component that provides user input to the computing device 400. Different implementations of the computing device 400 interface with different types of input devices. Example types of input devices include, but are not limited to, keyboards, mice, trackballs, stylus input devices, key pads, microphones, joysticks, touch-sensitive display screens, and other types of devices that provide user input to the computing device 400. The printer 420 is an external device that prints data to paper. Different implementations of the computing device 400 interface with different types of printers. Example types of printers include, but are not limited to laser printers, ink jet printers, photo printers, copy machines, fax machines, receipt printers, dot matrix printers, or other types of devices that print data to paper.

The communications medium 422 facilitates communication among the hardware components of the computing device 400. In different embodiments, the communications medium 422 facilitates communication among different components of the computing device 400. For instance, in the example of FIG. 4, the communications medium 422 facilitates communication among the memory 402, the processing system 404, the secondary storage device 406, the network interface card 408, the video interface 410, and the external component interface 414. In different implementations of the computing device 400, the communications medium 422 is implemented in different ways. For instance, in different implementations of the computing device 400, the communications medium 422 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 4, the memory 402 stores a Basic Input/Output System (BIOS) 424, an operating system 426, application software 428, and program data 430. The BIOS 524 includes a set of software instructions that, when executed by the processing system 404, cause the computing device 400 to boot up. The operating system 426 includes a set of software instructions that, when executed by the processing system 404, cause the computing device 400 to provide an operating system that coordinates the activities and sharing of resources of the computing device 400. Example types of operating systems include, but are not limited to, Microsoft Windows®, Linux, Unix, Apple OS X, Apple OS X iPhone, Palm webOS, Palm OS, Google Chrome OS, Google Android OS, and so on. The application software 428 includes a set of software instructions that, when executed by the processing system 404, cause the computing device 400 to provide applications to a user of the computing device 400. The program data 430 is data generated and/or used by the application software 428.

The various embodiments described above are provided by way of illustration only and should not be construed as limiting. Those skilled in the art will readily recognize various modifications and changes that may be made without following the example embodiments and applications illustrated and described herein.

We claim:

1. A method comprising:
receiving, by a computing system, a web services request to invoke a method of a web Application Programming Interface (API), wherein the web services request is a request to invoke an enumerate databases method of the web API, the enumerate databases request containing an identifier of a last seen database;
in response to receiving the web services request, invoking, by the computing system, a method of a language-dependent API of a client component in a collaboration system, the client component communicating with a collaboration server component in the collaboration system using a proprietary communications protocol, the method of the language-dependent API being a method to obtain data from the collaboration server component; and after invoking the method of the language-dependent API, sending, by the computing system, a web services response whose contents depend on the data obtained from the collaboration server component, wherein the web services response is an enumerate databases response responsive to the enumerate databases request and the enumerate databases response containing identifiers of databases having values greater than the identifier of the last seen database.

2. The method of claim 1,
wherein the web services request is received from a component implemented as a 64-bit application; and
wherein the language-dependent API is implemented as a 32-bit application.

3. The method of claim 2,
wherein the enumerate databases request specifies a given one of the collaboration server components in the collaboration system; and
the enumerate databases response specifies identifiers of databases in the given one of the collaboration server components.

4. The method of claim 3, further comprising:
receiving, by the computing system, an enumerate items request, the enumerate items request being a web services request to invoke an enumerate items method of the web API, the enumerate items request specifying a given database in the given one of the collaboration server components; and
sending an enumerate items response, the enumerate items response being a web services response that is responsive to the enumerate items request, the enumerate items request specifying identifiers of content items in the given database.

5. The method of claim 4, further comprising:
receiving, by the computing system, a fetch item request, the fetch item request being a web services request to invoke a fetch item method of the web API, the fetch item request specifying the identifier of a given content item in the given database; and
sending a fetch item response, the fetch item response being a web services response that is responsive to the fetch item request, the fetch item request containing an array of unique identifiers for documents attached to the given content item, a display URL of the given content item, content of the given content item, an array of properties of the given content item, a last modified time of the given content item, and a security descriptor of the given content item.

6. The method of claim 5, further comprising:
receiving, by the computing system, a fetch attachment request, the fetch attachment request being a web services request to invoke a fetch attachment method of the web API, the fetch attachment request containing a unique identifier of a given document attached to the given content item; and
sending a fetch attachment response, the fetch attachment response being a web services response that is responsive to the fetch attachment request, the fetch attachment response containing contents of the given document.

7. The method of claim 4, wherein the enumerate items request contains an identifier of a last seen content item; and
wherein the enumerate items response exclusively contains identifiers of content items having values greater than the identifier of the last seen content item.

8. The method of claim 1,
wherein the method of the web API is a method to obtain identifiers of collaboration server components in the collaboration system.

9. The method of claim 1, further comprising:
receiving, by the computing system, an enumerate servers request to the web API, the enumerate servers request being a web services request to invoke an enumerate servers method of the web API; and
sending, by the computing system, an enumerate servers response from the web API, the enumerate servers response being a web services response that is responsive to the enumerate servers request, the enumerate servers response containing identifiers of collaboration server components in the collaboration system.

10. A method comprising:
sending, by a component provided by a computing device, a web services request to invoke a method of a web Application Programming Interface (API) that uses a collaboration client component of a collaboration system to obtain data from a collaboration server component in the collaboration system, wherein the collaboration server component and the client component exclusively communicate with each other using a proprietary communications protocol;
receiving, by the component, a web services response from the web API as a response to the web services request, the web services response containing content based on the data obtained from the collaboration server component;
sending, by the component, an enumerate databases request to the web API, the enumerate databases request being a web services request to invoke an enumerate databases method of the web API; and
receiving, by the component, an enumerate databases response from the web API, the enumerate databases response being a web services response that is responsive to the enumerate databases request, wherein the enumerate databases request contains an identifier of a last seen database, and wherein the enumerate databases response contains identifiers of databases having values greater than the identifier of the last seen database.

11. The method of claim 10,
wherein the component is a 64-bit application; and
wherein the client component is a 32-bit application.

12. The method of claim 10, further comprising:
sending, by the component, an enumerate items request to the web API, the enumerate items request being a web services request to invoke an enumerate items method of the web API;
receiving, by the component, an enumerate items response from the web API, the enumerate items response containing identifiers of content items in a given database in the collaboration server component; and
after receiving the enumerate items response, modifying, by the component, an index such that the index contains entries that map terms that are applicable to the content items having identifiers contained in the enumerate items response to the content items having identifiers contained in the enumerate items response.

13. The method of claim 12,
wherein the enumerate items request contains an identifier of a last seen content item; and
wherein the enumerate items response exclusively contains identifiers of content items having values greater than the identifier of the last seen content item.

14. The method of claim 12, wherein the enumerate items response contains, for each content item having an identifier in the enumerate items response, an array of identifiers for documents attached to the content item, a display URL of the content item, content of the content item, an identifier of the content item, a list of properties of the content item, a last modified time of the content item, and a security descriptor of the content item.

15. The method of claim 12, wherein the method further comprises:
after modifying the index, receiving, by the component, a query;
in response to receiving the query, using, by the component, the index to identify ones of the content items that satisfy conditions specified by the query; and
sending, by the component, a query response that specifies the content items that satisfy the conditions specified by the query.

16. The method of claim 12, further comprising:
sending, by the component, a fetch attachment request to the web API, the fetch attachment request being a web services request to invoke a fetch attachment method of the web API, the fetch attachment request specifying an identifier of a given content item in the given database of content items, the fetch attachment request also specifying an identifier of a document attached to the given content item; and
receiving, by the component, a fetch attachment response from the web API, the fetch attachment response being a web services response that is responsive to the fetch attachment request, the fetch attachment response containing the document attached to the given content item.

17. The method of claim 12, further comprising:
sending, by the component, an enumerate servers request to the web API, the enumerate servers request being a web services request to invoke an enumerate servers method of the web API; and
receiving, by the component, an enumerate servers response from the web API, the enumerate servers response being a web services response that is responsive to the enumerate servers request, the enumerate servers response containing identifiers of collaboration server components in the collaboration system.

18. The method of claim 17, wherein the enumerate servers response contains a display URL and a unique identifier for collaboration server components in the collaboration system.

19. The method of claim 10, wherein the enumerate databases response contains an identifier and a last modified time for databases in the collaboration server component.

20. A computing system comprising:
a processing system; and
a computer-readable data storage system that stores software instructions that, when executed by the processing system, cause the computing system to:
send an enumerate servers request to a web API that obtains data from collaboration server components in a collaboration system, the enumerate servers request being a web services request to invoke an enumerate servers method of the web API, wherein the collaboration server components in the collaboration system and client components in the collaboration system exclusively communicate with each other using a proprietary communications protocol;
receive an enumerate servers response from the web API, the enumerate servers response being a web services response that is responsive to the enumerate servers request, the enumerate servers response containing display URLs and unique identifiers for collaboration server components in the collaboration system;

for each given collaboration server component having a unique identifier contained in the enumerate servers response:

send an enumerate databases request to the web API, the enumerate databases request being a web services request to invoke an enumerate databases method of the web API, the enumerate databases request specifying the unique identifier of the given collaboration server component;

receive an enumerate databases response from the web API, the enumerate databases response being a web services response that is responsive to the enumerate databases request, the enumerate databases response containing a unique identifier and a last modified time for each database in the given collaboration server component;

for each given database in the given collaboration server component:

send an enumerate items request to the web API, the enumerate items request being a web services request to invoke an enumerate items method of the web API, the enumerate items request specifying the unique identifier of the given database;

receive an enumerate items response from the web API, the enumerate items response being a web services response that is responsive to the enumerate items request, the enumerate items response containing unique identifiers for content items in the given database;

for each given content item having a unique identifier contained in the enumerate items response:

send a fetch item request to the web API, the fetch item request being a web services request to invoke a fetch item method of the web API, the fetch item request specifying the unique identifier of the given content item;

receive a fetch item response from the web API, the fetch item response being a web services response that is responsive to the fetch item request, the fetch item request containing an array of unique identifiers for documents attached to the given content item, a display URL of the given content item, content of the given content item, an array of properties of the given content item, a last modified time of the given content item, and a security descriptor of the given content item;

after receiving the fetch item response, modify an index such that entries in the index map terms applicable to the given content item to the given content item; and for each given document identified in the array of unique identifiers for documents attached to the given content item:

send a fetch attachment request to the web API, the fetch attachment request being a web services request to invoke a fetch attachment method of the web API, the enumerate databases response containing a unique identifier of the given document;

receive a fetch attachment response from the web API, the fetch attachment response being a web services response that is responsive to the fetch attachment request, the fetch attachment response containing contents of the given document; and modify the index such that the index contains entries that map terms applicable to the given document to the given content item.

\* \* \* \* \*